United States Patent
Berveling et al.

(10) Patent No.: US 12,476,061 B2
(45) Date of Patent: Nov. 18, 2025

(54) FAILURE MODE DETECTION IN A CONTACTOR

(71) Applicant: SENSATA TECHNOLOGIES, INC., Attleboro, MA (US)

(72) Inventors: Siebe Berveling, Deventer (NL); Paul Gennissen, Markelo (NL); Murray McTigue, Carpinteria, CA (US); Gregory Lyons, Victoria (CA)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 30 days.

(21) Appl. No.: 18/043,024

(22) PCT Filed: Sep. 15, 2021

(86) PCT No.: PCT/US2021/050547
§ 371 (c)(1),
(2) Date: Feb. 25, 2023

(87) PCT Pub. No.: WO2022/060902
PCT Pub. Date: Mar. 24, 2022

(65) Prior Publication Data
US 2024/0029978 A1    Jan. 25, 2024

Related U.S. Application Data

(60) Provisional application No. 63/078,473, filed on Sep. 15, 2020.

(51) Int. Cl.
*H01H 47/00* (2006.01)
*G01R 31/327* (2006.01)
(Continued)

(52) U.S. Cl.
CPC ....... *H01H 47/002* (2013.01); *G01R 31/3275* (2013.01); *H01H 47/22* (2013.01); *H01H 50/18* (2013.01)

(58) Field of Classification Search
CPC .. G01R 31/3275; H01H 50/18; H01H 47/002; H01H 47/22; H01H 50/20
See application file for complete search history.

(56) References Cited

U.S. PATENT DOCUMENTS 5,243,296 A * 9/1993 Ando ................. G01R 31/2829
324/207.22
5,754,387 A * 5/1998 Tennies ................ H01H 47/002
361/170
(Continued)

FOREIGN PATENT DOCUMENTS

EP    0813216 A2    12/1997
EP    3385108 A1    10/2018
(Continued)

OTHER PUBLICATIONS

International Search Report and Written Opinion, Jan. 21, 2022, PCT/US2021/050547, 10 pages.

*Primary Examiner* — Eman A Alkafawi
*Assistant Examiner* — Suresh K Rajaputra

(57) ABSTRACT

Methods and apparatuses for failure mode detection in a contactor are disclosed. In a particular embodiment, a method for failure mode detection in a contactor includes maintaining the contactor command signal in the open state; connecting the contactor to a voltage supply that supplies a first predetermined voltage amount to the contactor; measuring a first amount of time for a magnitude of a coil current of the coil to exceed a first predetermined current threshold; determining whether the first amount of time exceeds a first predetermined time threshold; responsive to determining that the first amount of time does not exceed the first predetermined time threshold, determining that the contactor is in the open state; and responsive to determining that the
(Continued)

first amount of time exceeds the first predetermined time threshold, determining that the contactor is in the closed state.

11 Claims, 10 Drawing Sheets

(51) Int. Cl.
  *H01H 47/22* (2006.01)
  *H01H 50/18* (2006.01)

(56) References Cited

U.S. PATENT DOCUMENTS

| | | | | |
|---|---|---|---|---|
| 5,784,245 | A * | 7/1998 | Moraghan | H01H 47/002 |
| | | | | 361/152 |
| 6,188,562 | B1 * | 2/2001 | Lutz | H01F 7/1844 |
| | | | | 361/170 |
| 2007/0291438 | A1 * | 12/2007 | Ahrens | F16K 37/0083 |
| | | | | 361/160 |
| 2016/0358732 | A1 * | 12/2016 | Nishio | G01R 31/3278 |
| 2017/0207014 | A1 * | 7/2017 | Forcet | H01F 7/081 |
| 2022/0020547 | A1 * | 1/2022 | Delbaere | H01H 50/44 |

FOREIGN PATENT DOCUMENTS

| | | | |
|---|---|---|---|
| JP | H1092283 | A | 4/1998 |
| JP | 2001506802 | A | 5/2001 |
| JP | 2004186052 | A | 7/2004 |
| JP | 2015162383 | A | 9/2015 |
| WO | 9824106 | A1 | 6/1998 |

* cited by examiner

FAILURE MODE DETECTION IN A CONTACTOR

BACKGROUND

A contactor is a device to make or break high voltage connections. Such a connector may include two electrical contacts that are closed and/or connected by a moveable switching element. In some instances, the moveable switching element is moved between an open state and a closed state by means of a coil and an anchor guided by the coil. In this design, if the anchor gets stuck or the moveable switching element becomes welded closed, the contactor may fail to operate correctly.

SUMMARY

Methods and apparatuses for failure mode detection in a contactor are disclosed. As will be explained below, a contactor according to embodiments of the present invention includes a plunger and a coil. The coil may be configured to be energized with a current or a voltage. In particular embodiments, the contactor is configured to move the plunger in response to a change in state of a contactor command signal. The contactor command signal may have a plurality of states including a first state and a second state. The first state of the contactor command signal directs the plunger to move to an open position that places the contactor in an open state in which the contactor does not connect a first connector and a second connector. The second state of the contactor command signal directs the plunger to move to a closed position that places the contactor in a closed state in which the contactor does connect the first connector and the second connector.

In a particular embodiment, a method for failure mode detection in a contactor includes determining whether the contactor is welded closed. To make this determination, the method includes a detection controller maintaining the contactor command signal in the open state and connecting the contactor to a voltage supply that supplies a first predetermined voltage amount to the contactor. The detection controller measures a first amount of time for a magnitude of a coil current of the coil to exceed a first predetermined current threshold. In this embodiment, the detection controller determines whether the first amount of time exceeds a first predetermined time threshold. Responsive to determining that the first amount of time does not exceed the first predetermined time threshold, the detection controller determines that the contactor is in the open state, which indicates that the contactor is not welded closed. However, responsive to determining that the first amount of time exceeds the first predetermined time threshold, the detection controller may determine that the contactor is in the closed state, which provides an indication that the contactor is welded closed.

In another embodiment of the present invention, a method for failure mode detection in a contractor includes determining whether the plunger of the contactor is stuck. To make this determination, the method includes a detection controller switching the contactor command signal from the open state into the closed state. Switching the contactor command signal to the closed state directs the plunger to move into the closed position, which places the contactor in the closed state. In this embodiment, the detection controller connects the contactor to a voltage supply that supplies a first voltage amount to the contactor. After applying the first voltage amount to the contactor, the detection controller determines changes in a magnitude of a coil current of the coil over a period of time. The detection controller determines whether the determined changes of the coil current over the period of time are associated with a pattern that indicates the plunger moved from the open position to the closed position. Responsive to determining that the determined changes are associated with the pattern, the detection controller may make a first determination that the plunger is not stuck. However, responsive to determining that the determined changes are not associated with the pattern, the detection controller may determine that the plunger is stuck.

In another embodiment of the present invention, a method for failure mode detection in a contactor includes determining whether a plunger of the contactor unexpectedly moves during monitoring, which may indicate a mechanical shock to the contactor. To make this determination, the method includes a detection controller lowering the coil current to a hold current threshold and maintaining the contactor at an efficient power level. In this embodiment, the detection controller monitors a magnitude of the coil current of the coil and determines whether the magnitude of the coil current changed within a first predetermined time period by at least a first predetermined amount. Responsive to determining that the magnitude of the coil current changed within the first predetermined time period by at least the first predetermined amount, the detection controller may determine that the plunger has unexpectedly moved despite the contactor command signal not changing states.

As will be explained below, a detection controller that detects fault modes (e.g., whether a contactor is welded closed, whether a plunger is stuck, or whether a plunger expectedly moves) may be used to improve the safety and reliability of a contactor. The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
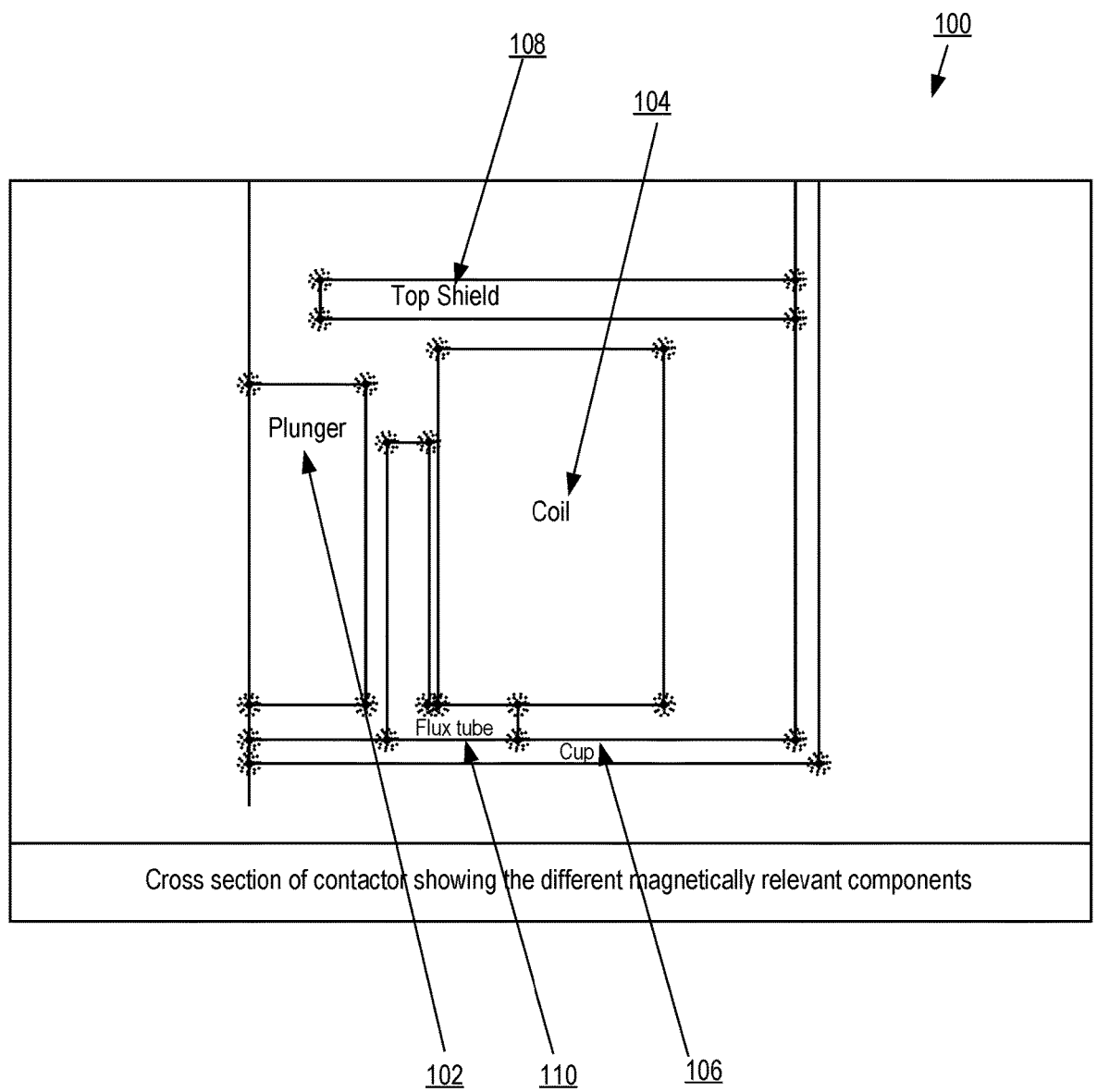
FIG. 1 illustrates a cross section of a contactor used for fault mode detection according to at least one embodiment of the present invention.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

Exemplary methods, apparatuses, devices, and computer program products for failure mode detection in a contactor in accordance with the present disclosure are described with reference to the accompanying drawings, beginning with FIG. 1. For further explanation, FIG. 1 sets forth a diagram of a contactor 100 that includes a plunger 102, a coil 104, a top shield 108, a flux tube 110, and a cup 106.

In the example of FIG. 1, the coil 104 may be configured to be energized with a current or a voltage. The contactor 100 may be configured to move the plunger 102 in response to a change in state of a contactor command signal. The contactor command signal may have a plurality of states including a first state and a second state. The first state of the contactor command signal directs the plunger 102 to move to an open position that places the contactor 100 in an open state in which the contactor 100 does not connect a first connector (not shown) and a second connector (not shown). The second state of the contactor command signal directs the plunger 102 to move to a closed position that places the contactor 100 in a closed state in which the contactor 100 does connect the first connector and the second connector.

Figure 2:
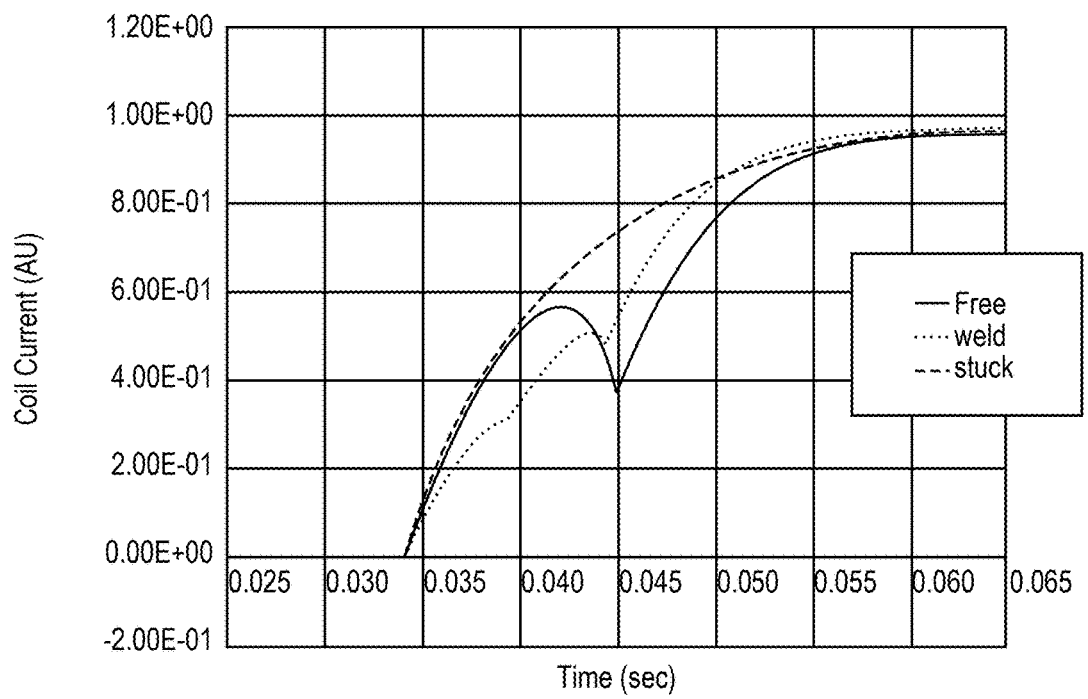
FIG. 2 illustrates three coil current signals caused by the movement of the plungers during closing of the contactor.

As explained above, the contactor may become welded closed, the plunger may become stuck, or the plunger may unexpectedly move. During these fault modes, the current through the coil (coil current signal) changes. See for example FIG. 2, which illustrates three coil current signals that are caused by the movement of the plungers during closing of the contactor when the contactor is welded closed; when the plunger is stuck; and when the plunger is free to move. As will be explained below, a detection controller may determine this change in the coil current and use the determination of changes to the coil current to detect the fault modes of the contactor.

Figure 3:
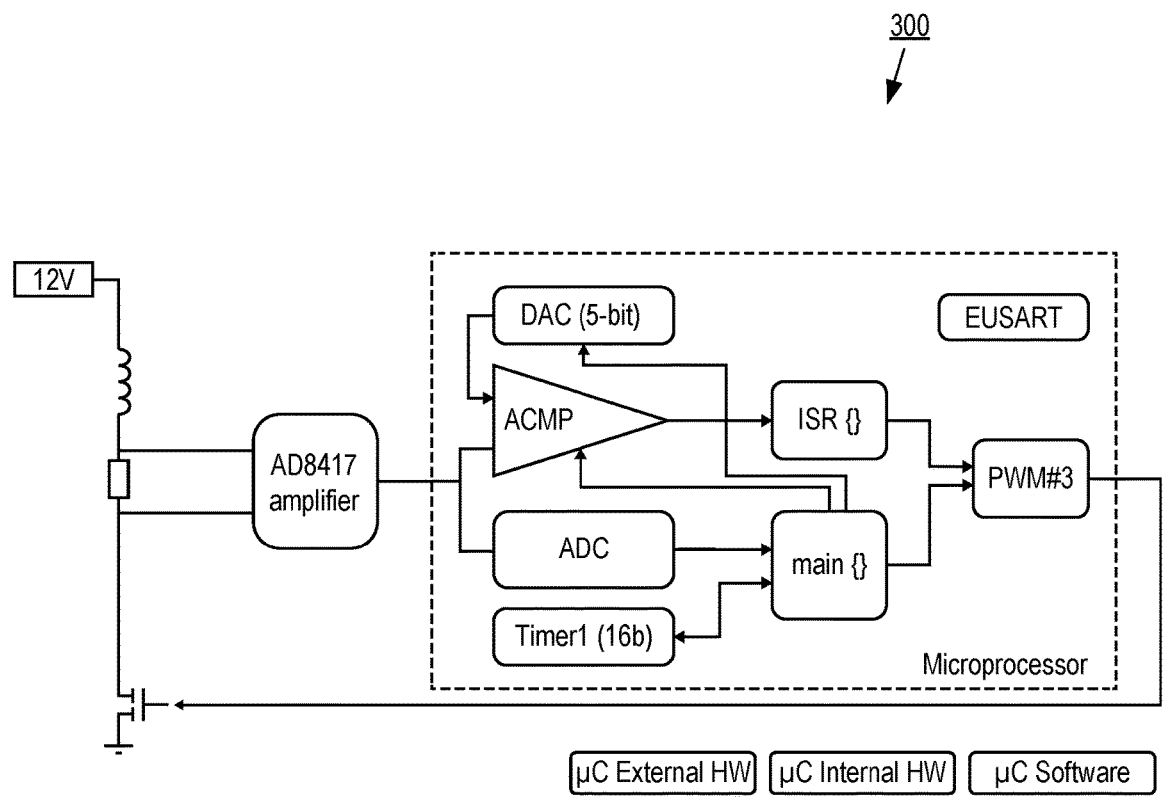
FIG. 3 illustrates an example of a detection controller according to at least one embodiment of the present invention.

For further explanation, FIG. 3 illustrates an example of a detection controller according to at least one embodiment of the present disclosure. In the example of FIG. 3, the detection controller 300 uses a microprocessor and peripheral components to detect changes to coil current or voltage within a contactor.

Figure 4:
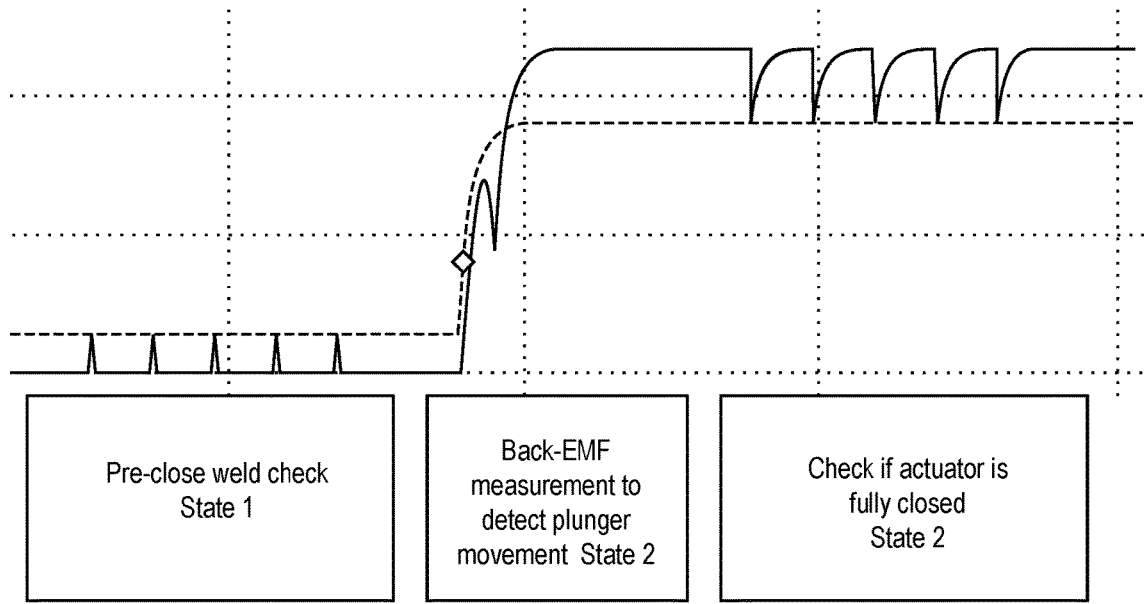
FIG. 4 illustrates the shape of the coil currents that are used to detect fault modes of a contactor according to at least one embodiment of the present invention.

The detection controller 300 may use the detection of the changes within the contactor to detect and diagnose fault modes of the contactor. For example, FIG. 4 illustrates the shape of the coil currents that are used to detect a first fault mode in which the contactor is welded closed, a second fault mode in which the plunger is stuck (did not fully close), and a third fault mode in which the plunger unexpectedly moves.

In a particular embodiment, the detection controller may be integrated in a custom integrated circuit that includes circuitry which economizes the power of the coil between various phases and can further include voltage suppression diodes such that a printed circuit board can be replaced with a single chip that includes the detection controller. In another embodiment, the single chip could be packaged in a custom package with custom lead frame that includes a method to allow easy, robust and cheap mounting in the contactor assembly such as press-fit connections or welding of coil wires to the package directly.

Figure 5:
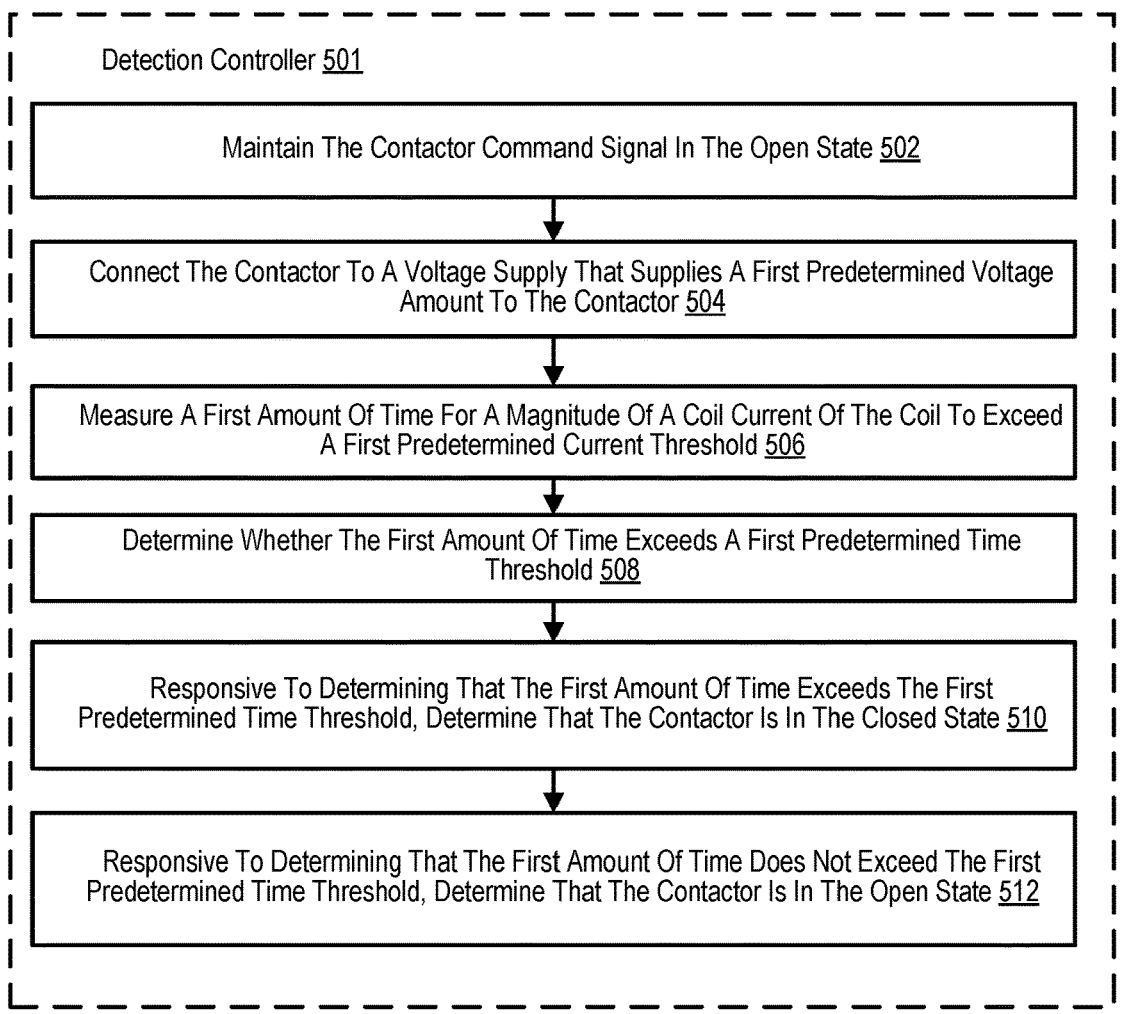
FIG. 5 is a flowchart of an example method for failure mode detection in a contactor in accordance with at least one embodiment of the present invention.

For further explanation, FIG. 5 sets forth a flow chart illustrating an exemplary method of failure mode detection in a contactor according to embodiments of the present disclosure. According to embodiments of the present invention, the contactor (e.g., the contactor 100 of FIG. 1) includes a plunger (e.g., the plunger 102 of FIG. 1) and a coil (e.g., the coil 104 of FIG. 1). The coil may be configured to be energized with a current or a voltage. In this example, the contactor is configured to move the plunger in response to a change in state of a contactor command signal. The contactor command signal may have a plurality of states including a first state and a second state. In the example of FIG. 5, the first state of the contactor command signal directs the plunger to move to an open position that places the contactor in an open state in which the contactor does not connect a first connector and a second connector. The second state of the contactor command signal directs the plunger to move to a closed position that places the contactor in a closed state in which the contactor does connect the first connector and the second connector.

As explained above, a contactor may experience one or more fault modes that prevent the contactor from connecting or disconnecting with connectors in accordance with the contactor command signal. An example of one such fault mode is when the contactor command signal is in the open state but the contactor is not fully opened since the last state, which indicates that the contactor is welded closed. A detection controller 501 in the method of FIG. 5 may be used to identify whether the contactor is in this fault mode by determining whether the contactor is closed despite the contactor command signal being in the open state. The detection controller 501 may be an example of the detection controller 300 of FIG. 3. In a particular embodiment, the detection controller may include computer program instructions that when executed cause the detection controller to perform fault mode detection in accordance with one or more embodiments of the present invention.

To make this determination, the method of FIG. 5 begins by maintaining 502 the contactor command signal in the open state. Maintaining 502 the contactor command signal in the open state may be carried out by continuing to supply a particular signal associated with the open state to the contactor. Alternatively, maintaining 502 the contactor command signal in the open state may be carried out by providing no signal. In this embodiment, providing no signal may indicate to the contactor the contactor command signal is in the open state.

The method of FIG. 5 also includes connecting 504 the contactor to a voltage supply that supplies a first predetermined voltage amount to the contactor. As explained above, a voltage supply may be used to energize the contactor. Connecting 504 the contactor to a voltage supply that supplies a first predetermined voltage amount to the contactor may be carried out by coupling the voltage supply to the contactor.

In addition, the method of FIG. 5 includes measuring 506 a first amount of time for a magnitude of a coil current of the coil to exceed a first predetermined current threshold. In a particular embodiment, the first predetermined current threshold is a current level sufficiently low to keep the plunger from moving. Measuring 506 a first amount of time for a magnitude of a coil current of the coil to exceed a first predetermined current threshold may be carried out by incrementing a counter to correspond to a passage of time; monitoring a coil current of the coil; determining whether the coil current exceeds the first predetermined current threshold; and continuing to increment the counter responsive to a determination that the coil current does not exceed the first predetermined current threshold.

The method of FIG. 5 includes determining 508 whether the first amount of time exceeds a first predetermined time threshold. The first predetermined time threshold may correspond with a maximum amount of time in which the inductance of the contactor would remain low, indicating that the contactor is open or not welded. Determining 508 whether the first amount of time exceeds a first predetermined time threshold may be carried out by comparing the first amount of time to the first predetermined time threshold.

The method of FIG. 5 also includes responsive to determining that the first amount of time exceeds the first predetermined time threshold, determining 510 that the contactor is in the closed state. Determining 510 that the contactor is in the closed state responsive to determining that the first amount of time exceeds the first predetermined time threshold may be carried out by transmitting a signal indicating that a fault has occurred or that a specific fault mode has occurred; setting or storing a flag or value that confirms the contactor is in the wrong state (closed state) or that a fault has occurred.

In addition, the method of FIG. 5 includes responsive to determining that the first amount of time does not exceed the first predetermined time threshold, determining 512 that the contactor is in the open state. Determining 512 that the contactor is in the open state responsive to determining that the first amount of time does not exceed the first predetermined time threshold may be carried out by storing an indication or flag confirming that the contactor is in the correct state (open state); or sending a signal confirming that the contactor is in the correct state.

Figure 6:
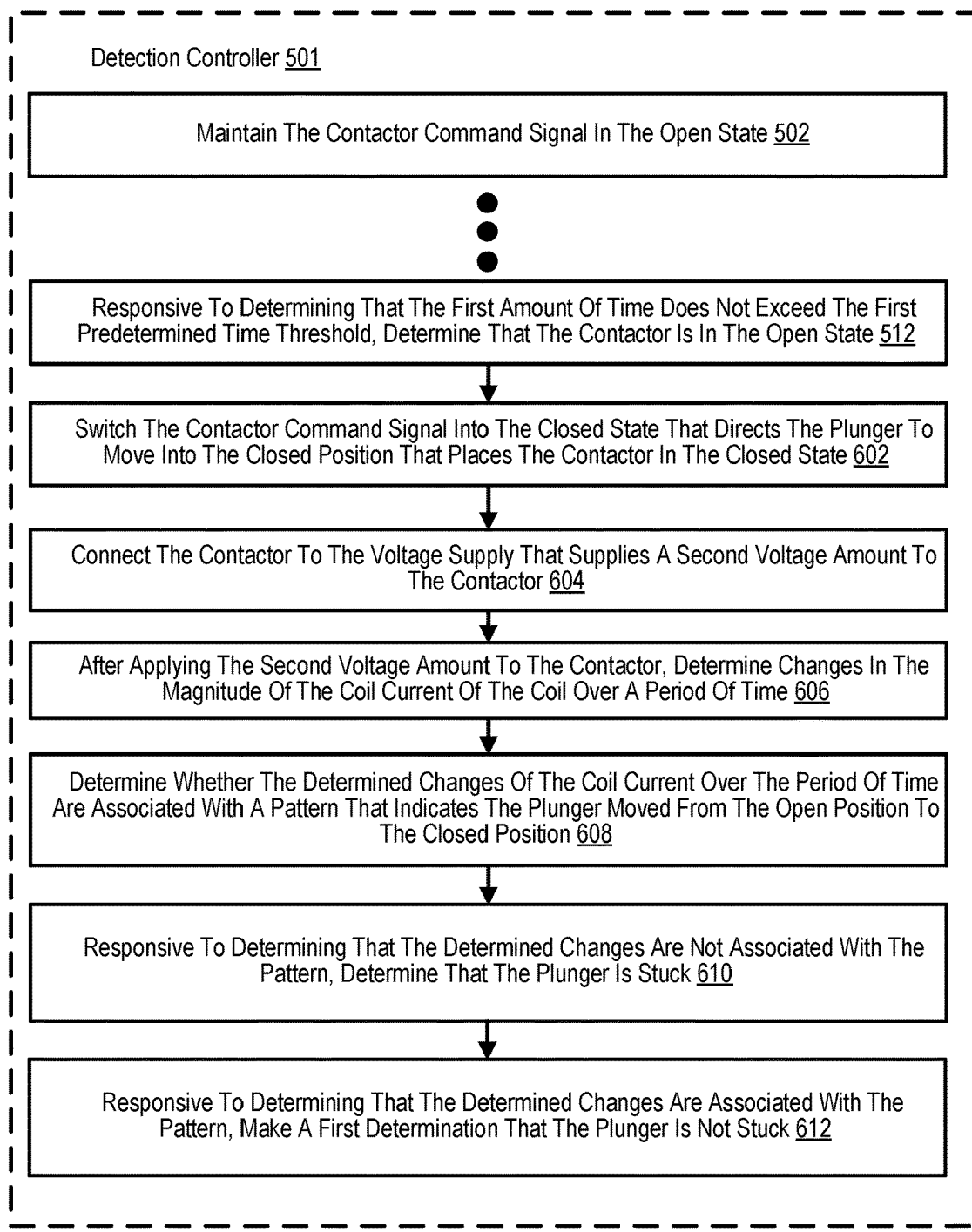
FIG. 6 is a flowchart of an example method for failure mode detection in a contactor in accordance with at least one embodiment of the present invention.

For further explanation, FIG. 6 sets forth a flow chart illustrating an exemplary method of failure mode detection in a contactor according to embodiments of the present disclosure. The method of FIG. 6 is similar to the method of FIG. 5 in that the method of FIG. 6 includes all of the elements of FIG. 5.

As explained above, a contactor may experience one or more fault modes that prevent the contactor from connecting or disconnecting in accordance with the contactor command signal. Another example of one such fault mode is when the contactor command signal is in the closed state and the contactor's previous state was the open state, but the contactor is not fully closed. One reason that a contactor might not switch to the closed state is that the plunger is stuck. The method of FIG. 6 includes steps for identifying this particular fault mode by determining whether the plunger is stuck.

To make this determination, the method of FIG. 6 begins by switching 602 the contactor command signal into the closed state that directs the plunger to move into the closed position that places the contactor in the closed state. Switching 602 the contactor command signal into the closed state that directs the plunger to move into the closed position that places the contactor in the closed state may be carried out by changing the magnitude or frequency of the contactor command signal to indicate the closed state; and applying that changed signal to the contactor.

The method of FIG. 6 also includes connecting 604 the contactor to the voltage supply that supplies a second voltage amount to the contactor. Connecting 604 the contactor to the voltage supply that supplies a second voltage amount to the contactor may be carried out by coupling the voltage supply to the contactor. The second voltage amount may be equal to the voltage amount in FIG. 5.

In addition, the method of FIG. 6 also includes after applying the second voltage amount to the contactor, determining 606 changes in the magnitude of the coil current of the coil over a period of time. Determining 606 changes in the magnitude of the coil current of the coil over a period of time may be carried out by incrementing a counter that tracks an amount of time, determining whether the amount of time exceeds a threshold; measuring the coil current; and storing measurements of the coil current at different time intervals.

The method of FIG. 6 also includes determining 608 whether the determined changes of the coil current over the period of time are associated with a pattern that indicates the plunger moved from the open position to the closed position. Determining 608 whether the determined changes of the coil current over the period of time are associated with a pattern that indicates the plunger moved from the open position to the closed position may be carried out by retrieving one or more patterns that each indicate a magnitude of a coil current at different time intervals for a period of time; and comparing the determined changes in the coil current at different time intervals to one or more of the patterns. In a particular embodiment, the one or more patterns may be stored in a memory or storage location accessible by the detection controller 501.

The method of FIG. 6 includes responsive to determining that the determined changes are not associated with the pattern, determining 610 that the plunger is stuck. Determining 610 that the plunger is stuck may be carried out by transmitting a signal indicating that a fault has occurred or that a specific fault mode has occurred; and setting or storing a flag or value that confirms the plunger is stuck or that a fault has occurred. In a particular embodiment, the process for determining a fault is determined once a fault has been detected.

The method of FIG. 6 also includes responsive to determining that the determined changes are associated with the pattern, making 612 a first determination that the plunger is not stuck. Making 612 a first determination that the plunger is not stuck may be carried out by storing an indication or flag confirming that the plunger is not stuck; or sending a signal confirming that the plunger is not stuck.

Figure 7:
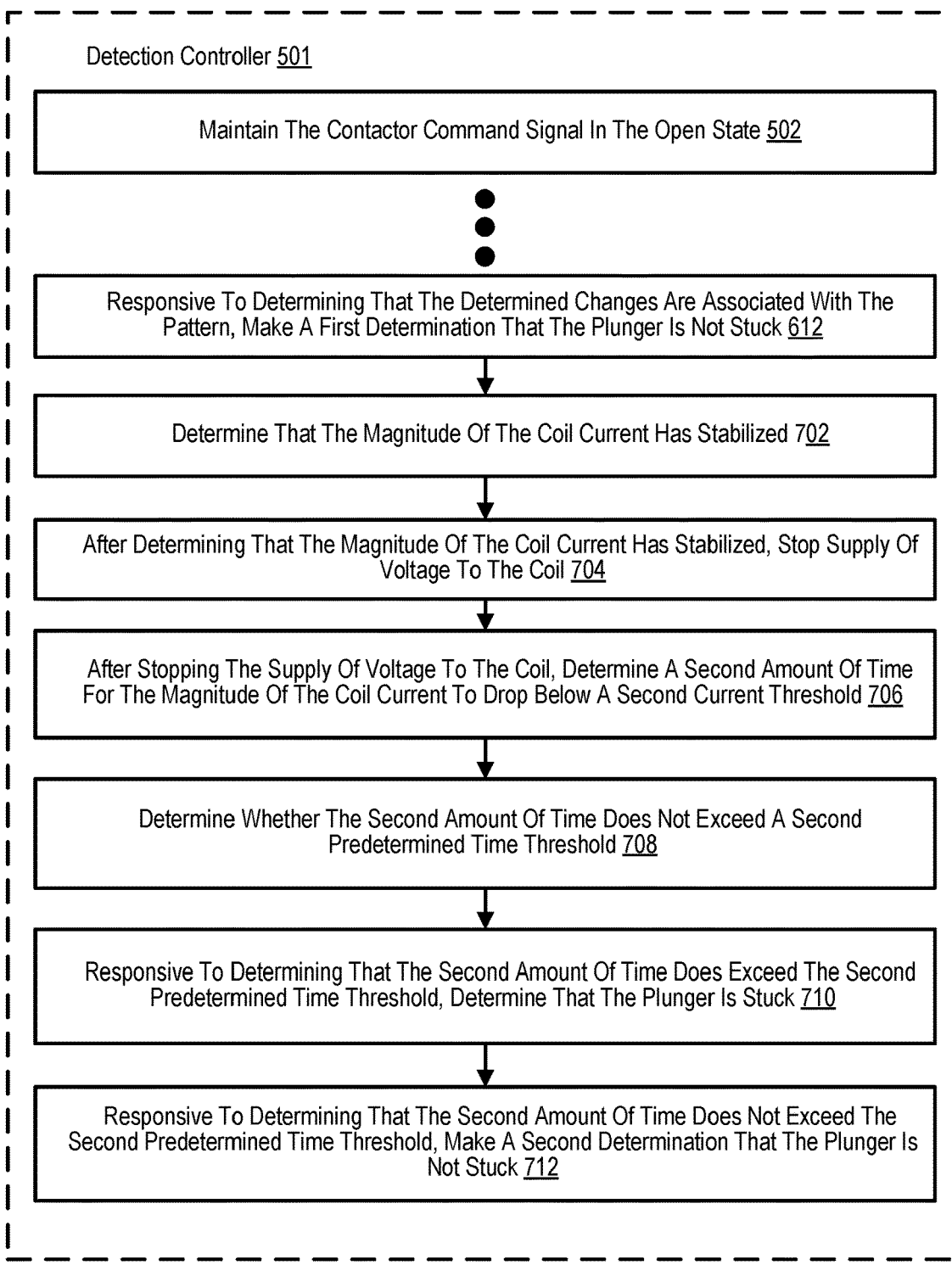
FIG. 7 is a flowchart of an example method for failure mode detection in a contactor in accordance with at least one embodiment of the present invention.

For further explanation, FIG. 7 sets forth a flow chart illustrating an exemplary method of failure mode detection in a contactor according to embodiments of the present disclosure. The method of FIG. 7 is similar to the method of FIG. 6 in that the method of FIG. 7 includes all of the elements of FIG. 6.

The method of FIG. 7 provides further steps for determining whether a plunger is stuck. Specifically, the method of FIG. 7 includes determining 702 that the magnitude of the coil current has stabilized. Determining 702 that the magnitude of the coil current has stabilized may be carried out by monitoring the coil current; measuring samples of the magnitude of the coil current; comparing the samples to each other to determine an amount of deviation; and determining whether the amount of deviation exceeds a threshold.

The method of FIG. 7 also includes after determining that the magnitude of the coil current has stabilized, stopping 704 supply of voltage to the coil. Stopping 704 supply of voltage to the coil may be carried out by disconnecting the voltage supply from the coil.

In addition, the method of FIG. 7 also includes after stopping the supply of voltage to the coil, determining 706 a second amount of time for the magnitude of the coil current to drop below a second current threshold. Determining 706 a second amount of time for the magnitude of the coil current to drop below a second current threshold may be carried out by incrementing a counter to correspond to a passage of time; monitoring a coil current of the coil; determining whether the coil current drops below the second predetermined current threshold; and continuing to increment the counter responsive to a determination that the coil current does not drop below the second predetermined current threshold. For example, if the second amount of time is below the second predetermined time threshold, the inductance of the coil may be assumed to be below a certain threshold and the magnetic system is saturated, which indicates that the contactor is fully closed and the plunger is not stuck in the open position.

The method of FIG. 7 also includes determining 708 whether the second amount of time does not exceed a second predetermined time threshold. Determining 708 whether the second amount of time does not exceed a second predetermined time threshold may be carried out by comparing the second amount of time to the second predetermined time threshold.

The method of FIG. 7 includes responsive to determining that the second amount of time does exceed the second predetermined time threshold, determining 710 that the plunger is stuck in the open position. Determining 710 that the plunger is stuck may be carried out by transmitting a signal indicating that a fault has occurred or that a specific fault mode has occurred; setting or storing a flag or value that confirms the plunger is stuck or that a fault has occurred.

The method of FIG. 7 continues by responsive to determining that the second amount of time does not exceed the second predetermined time threshold, making 712 a second determination that the plunger is not stuck. Making 712 a second determination that the plunger is not stuck may be carried out by storing an indication or flag confirming that the plunger is not stuck; or sending a signal confirming that the plunger is not stuck.

Figure 8:
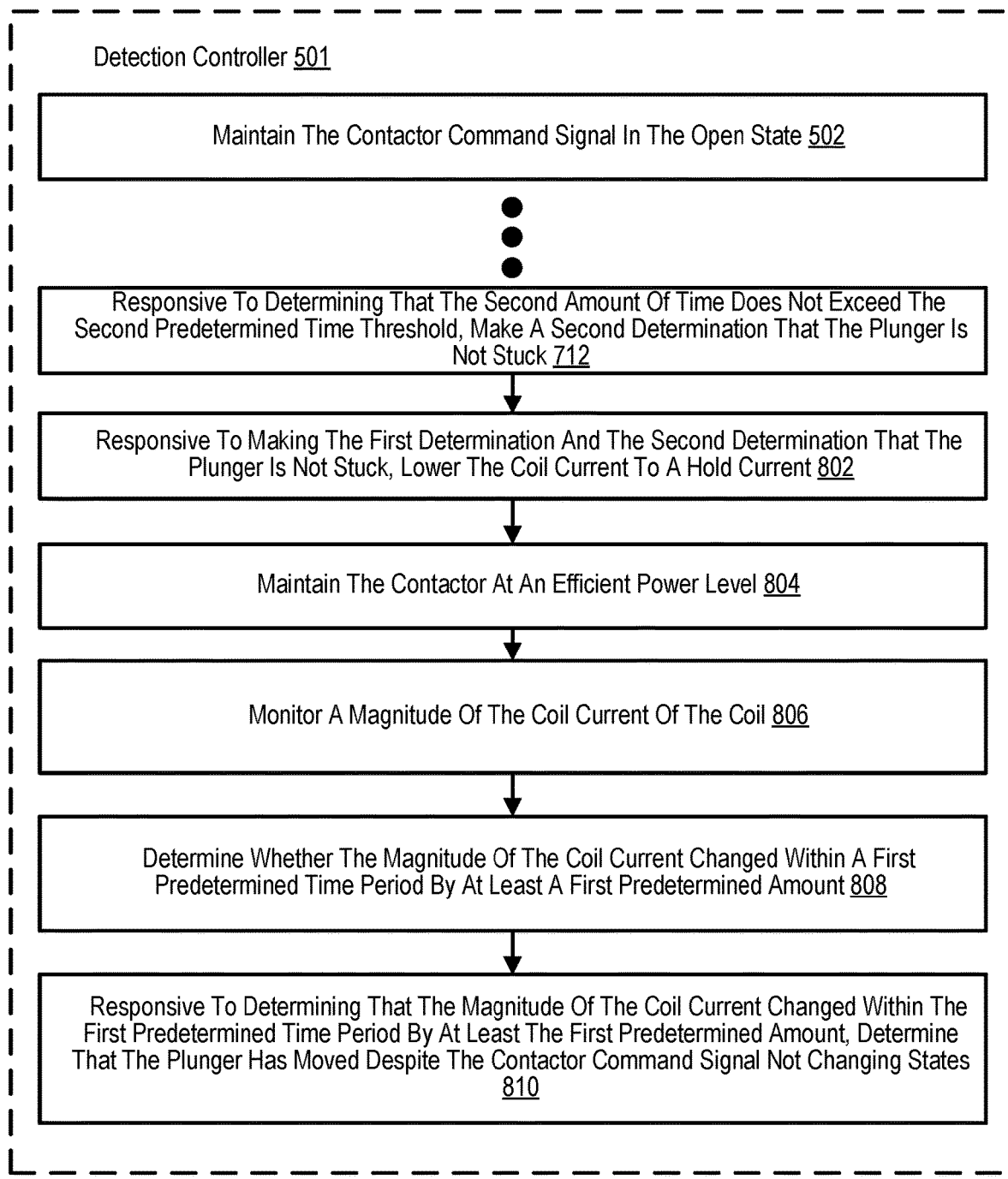
FIG. 8 is a flowchart of an example method for failure mode detection in a contactor in accordance with at least one embodiment of the present invention.

For further explanation, FIG. 8 sets forth a flow chart illustrating an exemplary method of failure mode detection in a contactor according to embodiments of the present disclosure. The method of FIG. 8 is similar to the method of FIG. 7 in that the method of FIG. 8 includes all of the elements of FIG. 7.

After using the method of FIG. 7 to determine whether the plunger is stuck, the method of FIG. 8 may be used to determine whether the contactor is experiencing another fault mode in which the plunger is unexpectantly moving (e.g., due to mechanical shock). In this example embodiment, the contactor command signal is in the closed state and the contactor's previous state was the closed state.

After making the first determination and the second determination that the plunger is not stuck in FIG. 7, the method of FIG. 8 begins by lowering 802 the coil current to a hold current. Lowering 802 the coil current to a hold current may be carried out by changing the voltage or current applied to the contactor; measuring the magnitude of the coil current; and comparing the measured magnitude of the coil current to the hold current setpoint. The hold current setpoint may be selected to maintain the contactor at an efficient power level.

The method of FIG. 8 also includes maintaining 804 the contactor at an efficient power level. Maintaining 804 the contactor at an efficient power level may be carried out by adjusting the drive voltage to the coil using pulse width modulation "PWM".

In addition, the method of FIG. 8 includes monitoring 806 a magnitude of the coil current of the coil. Monitoring 806 a magnitude of the coil current of the coil may be carried out by continuously or periodically measuring the magnitude of the coil current.

The method of FIG. 8 also includes determining 808 whether the magnitude of the coil current changed within a first predetermined time period by at least a first predetermined amount. Determining 808 whether the magnitude of the coil current changed within a first predetermined time period by at least a first predetermined amount may be carried out by incrementing a counter to correspond to a passage of time; determining whether the counter indicates an amount that exceeds the predetermined time period; determining an amount of change or deviation in the coil current while the counter indicates an amount that does not exceed the predetermined time period; and determining whether the amount of change or deviation exceeds the first predetermined amount.

The method of FIG. 8 includes responsive to determining that the magnitude of the coil current changed within the first predetermined time period by at least the first predetermined amount, determining 810 that the plunger has moved despite the contactor command signal not changing states. Determining 810 that the plunger has moved despite the contactor command signal not changing states may be carried out by transmitting a signal indicating that a fault has occurred or that a specific fault mode has occurred; setting or storing a flag or value that confirms the plunger unexpectedly moved or that a fault has occurred.

Figure 9:
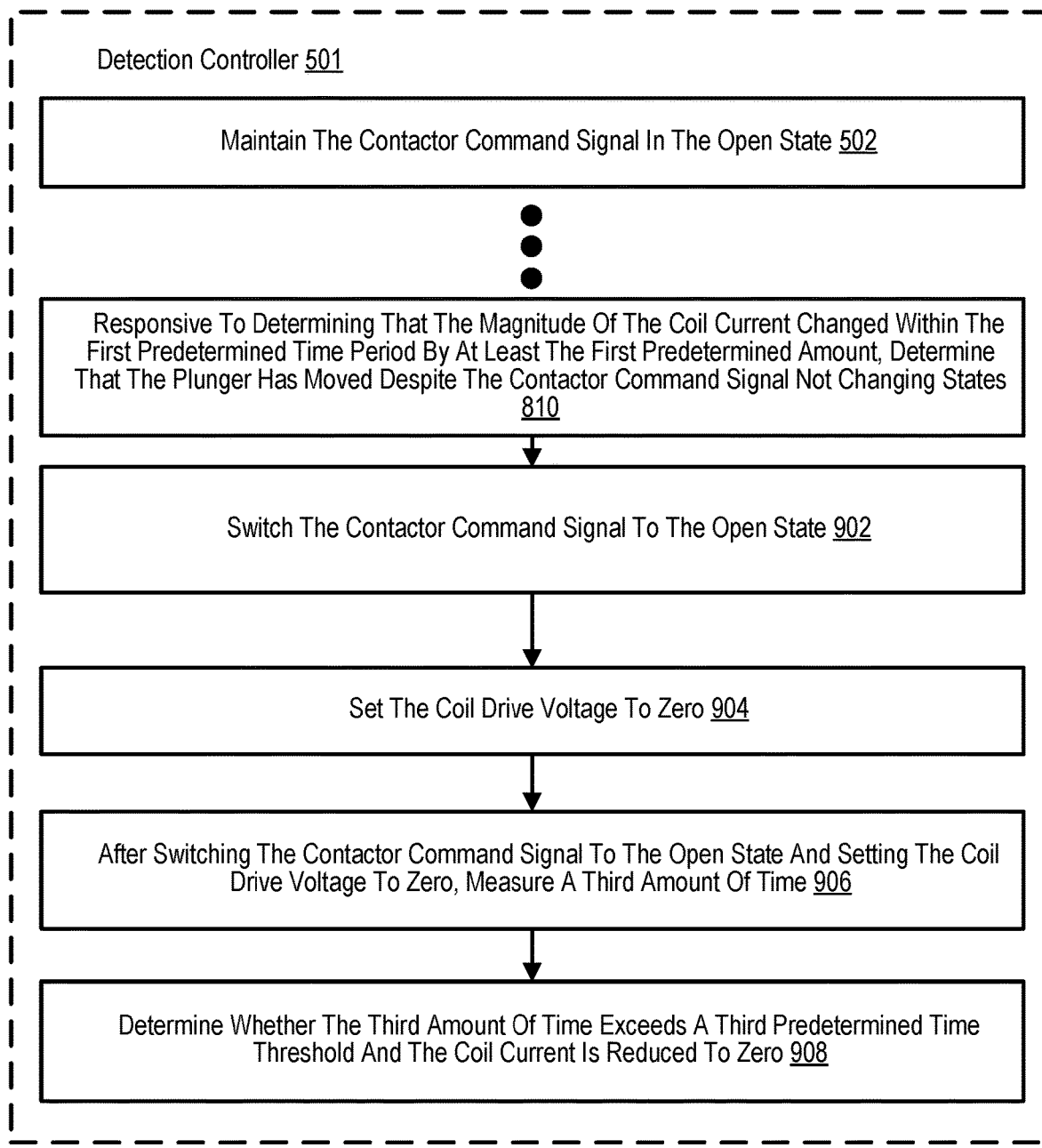
FIG. 9 is a flowchart of an example method for failure mode detection in a contactor in accordance with at least one embodiment of the present invention.

For further explanation, FIG. 9 sets forth a flow chart illustrating an exemplary method of failure mode detection in a contactor according to embodiments of the present disclosure. The method of FIG. 9 is similar to the method of FIG. 8 in that the method of FIG. 9 includes all of the elements of FIG. 8.

After determining in FIG. 8 that the plunger unexpectedly moved, the method of FIG. 9 may be used to attempt to open the contactor to avoid welding due to restrike. The method of FIG. 9 includes switching 902 the contactor command signal to the open state. Switching 902 the contactor command signal to the open state may be carried out by changing the magnitude or frequency of the contactor command signal to indicate the open state; and applying that changed signal to the contactor.

The method of FIG. 9 also includes setting 904 the coil drive voltage to zero. Setting 904 the coil drive voltage to zero may be carried out by lowering the coil drive voltage.

The method of FIG. 9 also includes after switching the contactor command signal to the open state and setting the coil drive voltage to zero, measuring 906 a third amount of time. Measuring 906 a third amount of time may be carried out by incrementing a counter to correspond to a passage of time.

In addition, the method of FIG. 9 also includes determining 908 whether the fourth amount of time exceeds a fourth predetermined time threshold and the coil current is reduced to zero. Determining 908 whether the third amount of time exceeds a third predetermined time threshold and the coil current is reduced to zero may be carried out by monitoring a coil current of the coil; determining whether the coil current is reduced to zero; continuing to increment the counter responsive to a determination that the coil current is not reduced to zero; and comparing the counter to the third predetermined time threshold.

Figure 10:
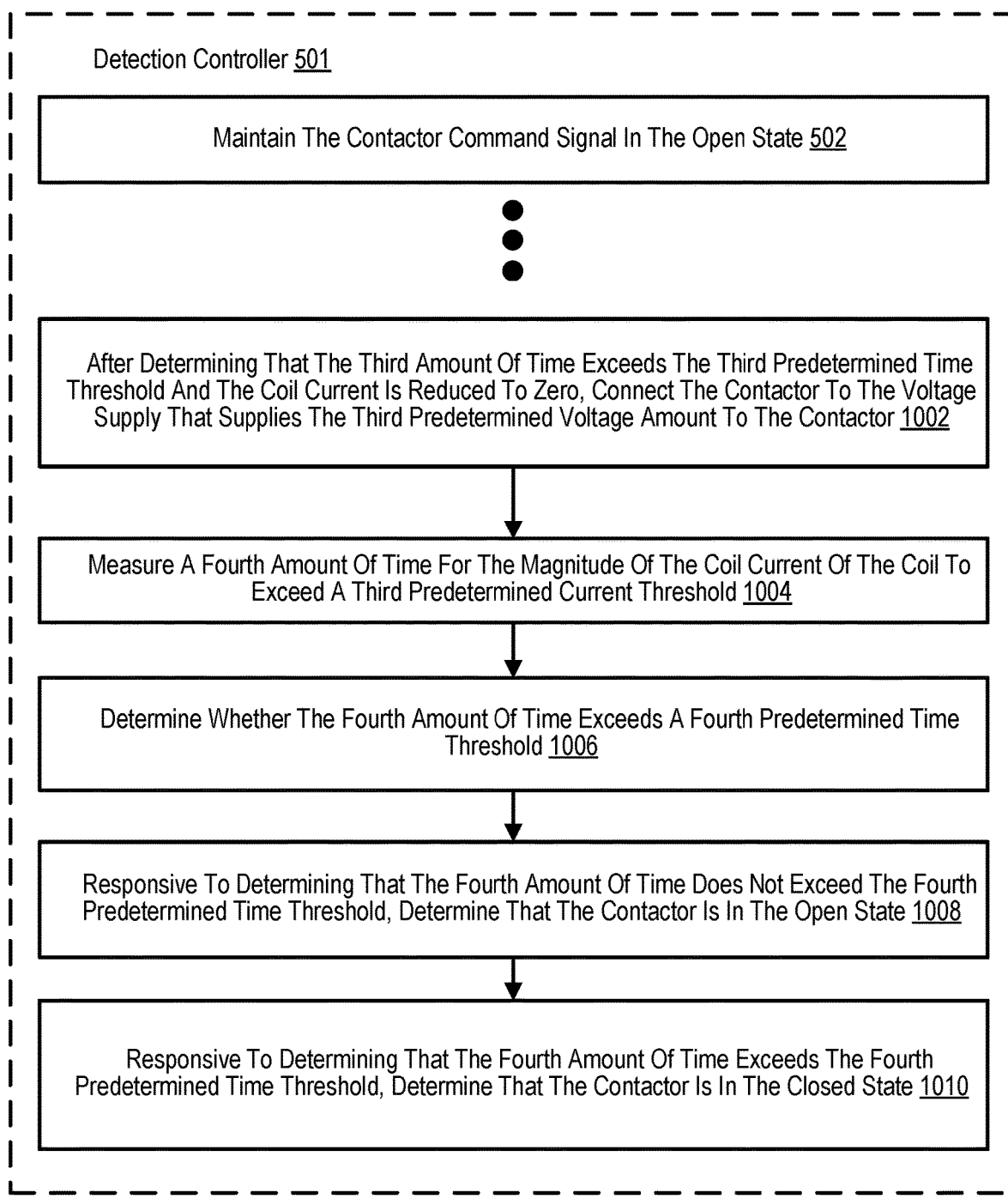
FIG. 10 is a flowchart of an example method for failure mode detection in a contactor in accordance with at least one embodiment of the present invention.

For further explanation, FIG. 10 sets forth a flow chart illustrating an exemplary method of failure mode detection in a contactor according to embodiments of the present disclosure. The method of FIG. 10 is similar to the method of FIG. 9 in that the method of FIG. 10 includes all of the elements of FIG. 9. However, the method of FIG. 10 includes additional elements for determining whether the contactor is welded closed. The method of FIG. 10 includes connecting 1002 the contactor to the voltage supply that supplies the third predetermined voltage amount to the contactor. Connecting 1002 the contactor to the voltage supply that supplies the third predetermined voltage amount to the contactor may be carried out by coupling the voltage supply to the contactor.

The method of FIG. 10 also includes measuring 1004 a fourth amount of time for the magnitude of the coil current of the coil to exceed a third predetermined current threshold. Measuring 1004 a fourth amount of time for the magnitude of the coil current of the coil to exceed a third predetermined current threshold may be carried out by incrementing a counter to correspond to a passage of time; monitoring a coil current of the coil; determining whether the coil current exceeds the fourth predetermined current threshold; and continuing to increment the counter responsive to a determination that the coil current does not exceed the fourth predetermined current threshold.

In addition, the method of FIG. 10 includes determining 1006 whether the fourth amount of time exceeds a fourth predetermined time threshold. Determining 1006 whether the fourth amount of time exceeds a fourth predetermined time threshold may be carried out by comparing the fourth amount of time to the fourth predetermined time threshold.

The method of FIG. 10 also includes responsive to determining that the fourth amount of time does not exceed the fourth predetermined time threshold, determining 1008 that the contactor is in the open state. Determining 1008 that the contactor is in the open state may be carried out by storing an indication or flag confirming that the contactor is in the correct state (open state); or sending a signal confirming that the contactor is in the correct state.

The method of FIG. 10 also includes responsive to determining that the fourth amount of time exceeds the fourth predetermined time threshold, determining 1010 that the contactor is in the closed state. Determining 1010 that the contactor is in the closed state may be carried out by transmitting a signal indicating that a fault has occurred or that a specific fault mode has occurred; setting or storing a flag or value that confirms the contactor is in the wrong state (closed state) or that a fault has occurred.

Exemplary embodiments of the present invention are described largely in the context of a fully functional computer system for adjustment of failure mode detection in a contactor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Advantages and features of the present disclosure can be further described by the following statements:

1. A method for failure mode detection in a contactor, the contactor including a plunger and a coil, the coil configured to be energized with a current or a voltage, the contactor configured to move the plunger in response to a change in state of a contactor command signal, the contactor command signal having a first state and a second state, the first state of the contactor command signal directing the plunger to move to an open position that places the contactor in an open state in which the contactor does not connect a first connector and a second connector, the second state of the contactor command signal directing the plunger to move to a closed position that places the contactor in a closed state in which the contactor does connect the first connector and the second connector, the method comprising: maintaining the contactor command signal in the open state; connecting the contactor to a voltage supply that supplies a first predetermined voltage amount to the contactor; measuring a first amount of time for a magnitude of a coil current of the coil to exceed a first predetermined current threshold; determining whether the first amount of time exceeds a first predetermined time threshold; responsive to determining that the first amount of time does not exceed the first predetermined time threshold, determining that the contactor is in the open state; and responsive to determining that the first amount of time exceeds the first predetermined time threshold, determining that the contactor is in the closed state.

2. The method of statement 1 further comprising: switching the contactor command signal into the closed state that directs the plunger to move into the closed position that places the contactor in the closed state; connecting the contactor to the voltage supply that supplies a second voltage amount to the contactor; after applying the second voltage amount to the contactor, determining changes in the magnitude of the coil current of the coil over a period of time; determining whether the determined changes of the coil current over the period of time are associated with a pattern that indicates the plunger moved from the open position to the closed position; responsive to determining that the determined changes are associated with the pattern, making a first determination that the plunger is not stuck; and responsive to determining that the determined changes are not associated with the pattern, determining that the plunger is stuck.

3. The method of statement 1 or 2 further comprising: determining that the magnitude of the coil current has stabilized; after determining that the magnitude of the coil current has stabilized, stopping supply of voltage to the coil; after stopping the supply of voltage to the coil, determining a second amount of time for the magnitude of the coil current to drop below a second current threshold; determining whether the second amount of time does not exceed a second predetermined time threshold; responsive to determining that the second amount of time does not exceed the second predetermined time threshold, making a second determination that the plunger is not stuck; and responsive to determining that the second amount of time does exceed the second predetermined time threshold, determining that the plunger is stuck.

4. The method of any of statements 1-3 further comprising: responsive to making the first determination and the second determination that the plunger is not stuck, lowering the coil current to a hold current threshold; maintaining the contactor at an efficient power level; monitoring a magnitude of the coil current of the coil; determining whether the magnitude of the coil current changed within a first predetermined time period by at least a first predetermined amount; and responsive to determining that the magnitude of the coil current changed within the first predetermined time period by at least the first predetermined amount, determining that the plunger has moved despite the contactor command signal not changing states.

5. The method of any of statements 1-4 further comprising: switching the contactor command signal to the open state; setting the coil drive voltage to zero; after switching the contactor command signal to the open state and setting the coil drive voltage to zero, measuring a third amount of time; and determining whether the third amount of time exceeds a third predetermined time threshold and the coil current is reduced to zero.

6. The method of any of statements 1-5 further comprising after determining that the third amount of time exceeds the third predetermined time threshold and the coil current is reduced to zero, connecting the contactor to the voltage supply that supplies the third predetermined voltage amount to the contactor; measuring a fourth amount of time for the magnitude of the coil current of the coil to exceed a third predetermined current threshold; determining whether the fourth amount of time exceeds a fourth predetermined time threshold; responsive to determining that the fourth amount of time does not exceed the fourth predetermined time threshold, determining that the contactor is in the open state; and responsive to determining that the fourth amount of time exceeds the fourth predetermined time threshold, determining that the contactor is in the closed state.

7. The following method alone or in combination with any of the statements 1-6, a method for failure mode detection in a contactor, the contactor including a plunger and a coil, the coil configured to be energized with a current or a voltage, the contactor configured to move the plunger in response to a change in state of a contactor command signal, the contactor command signal having a first state and a second state, the first state of the contactor command signal directing the plunger to move to an open position that places the contactor in an open state in which the contactor does not connect a first connector and a second connector, the second state of the contactor command signal directing the plunger to move to a closed position that places the contactor in a closed state in which the contactor does connect the first connector and the second connector, the method comprising: switching the contactor command signal from the open state into the closed state that directs the plunger to move into the closed position that places the contactor in the closed state; connecting the contactor to a voltage supply that supplies a first voltage amount to the contactor; after applying the first voltage amount to the contactor, determining changes in a magnitude of a coil current of the coil over a period of time; determining whether the determined changes of the coil current over the period of time are associated with a pattern that indicates the plunger moved from the open position to the closed position; responsive to determining that the determined changes are associated with the pattern, making a first determination that the plunger is not stuck; and responsive to determining that the determined changes are not associated with the pattern, determining that the plunger is stuck.

8. The method of any of statements 1-7 further comprising: determining that the magnitude of the coil current has stabilized; after determining that the magnitude of the coil current has stabilized, stopping supply of voltage to the coil; after stopping the supply of voltage to the coil, determining a first amount of time for the magnitude of the coil current to drop below a first current threshold; determining whether the first amount of time does not exceed a first predetermined time threshold; responsive to determining that the first amount of time does not exceed the first predetermined time threshold, making a second determination that the plunger is not stuck; and responsive to determining that the first amount of time does exceed the first predetermined time threshold, determining that the plunger is stuck.

9. The method of any of statements 1-8 further comprising: responsive to making the first determination and the second determination that the plunger is not stuck, lowering the coil current to a hold current threshold; maintaining the contactor at an efficient power level; monitoring the magnitude of the coil current of the coil; determining whether the magnitude of the coil current changed within a first predetermined time period by at least a first predetermined amount; responsive to determining that the magnitude of the coil current changed within the first predetermined time period by at least the first predetermined amount, determining that the plunger has moved despite the contactor command signal not changing states.

10. The method of any of statements 1-9 further comprising: responsive to determining that the magnitude of the coil current changed within the first predetermined time period by at least the first predetermined amount: determining that the magnitude of the coil current has stabilized; after determining that the magnitude of the coil current has stabilized, stopping supply of voltage to the coil; after stopping the supply of voltage to the coil, determining a second amount of time for the magnitude of the coil current to drop below a second current threshold; determining whether the second amount of time does not exceed a second predetermined time threshold; responsive to determining that the second amount of time does not exceed the second predetermined time threshold, determining that the contactor is in the closed state; and responsive to determining that the second amount of time does exceed the second predetermined time threshold, determining that the contactor is in the open state.

13. The method of any of statements 1-12 wherein determining a current state of the contactor includes: connecting the contactor to the voltage supply that supplies the second predetermined voltage amount to the contactor; measuring a fourth amount of time for the magnitude of the coil current of the coil to exceed a fourth predetermined current threshold; determining whether the fourth amount of time exceeds a fourth predetermined time threshold; responsive to determining that the fourth amount of time does not exceed the fourth predetermined time threshold, determining that the contactor is in the open state; and responsive to determining that the fourth amount of time exceeds the fourth predetermined time threshold, determining that the contactor is in the closed state.

14. An apparatus for failure mode detection in a contactor, the contactor including a plunger and a coil, the coil configured to be energized with a current or a voltage, the contactor configured to move the plunger in response to a change in state of a contactor command signal, the contactor command signal having a first state and a second state, the first state of the contactor command signal directing the plunger to move to an open position that places the contactor in an open state in which the contactor does not connect a first connector and a second connector, the second state of the contactor command signal directing the plunger to move to a closed position that places the contactor in a closed state in which the contactor does connect the first connector and the second connector, the apparatus configured to carry out the operations of: determining that a previously determined state of the contactor is the open state and the contactor command signal is in the open state; connecting the contactor to a voltage supply that supplies a first predetermined voltage amount to the contactor; measuring a first amount of time for a magnitude of a coil current of the coil to exceed a first predetermined current threshold; determining whether the first amount of time exceeds a first predetermined time threshold; responsive to determining that the first amount of time does not exceed the first predetermined time threshold, determining that the contactor is in the open state; and responsive to determining that the first amount of time exceeds the first predetermined time threshold, determining that the contactor is in the closed state.

15. The apparatus of statement 14 further configured to carry out the operations of: switching the contactor command signal into the closed state that directs the plunger to move into the closed position that places the contactor in the closed state; connecting the contactor to the voltage supply that supplies a second voltage amount to the contactor; after applying the second voltage amount to the contactor, determining changes in the magnitude of the coil current of the coil over a period of time; determining whether the determined changes of the coil current over the period of time are associated with a pattern that indicates the plunger moved from the open position to the closed position; responsive to determining that the determined changes are associated with the pattern, making a first determination that the plunger is not stuck; and responsive to determining that the determined changes are not associated with the pattern, determining that the plunger is stuck.

16. The apparatus of statement 14 or 15 further configured to carry out the operations of: determining that the magnitude of the coil current has stabilized; after determining that the magnitude of the coil current has stabilized, stopping supply of voltage to the coil; after stopping the supply of voltage to the coil, determining a second amount of time for the magnitude of the coil current to drop below a second current threshold; determining whether the second amount of time does not exceed a second predetermined time threshold; responsive to determining that the second amount of time does not exceed the second predetermined time threshold, making a second determination that the plunger is not stuck; and responsive to determining that the second amount of time does exceed the second predetermined time threshold, determining that the plunger is stuck.

17. The apparatus of any of statements 14-16 further configured to carry out the operations of: determining that the magnitude of the coil current has stabilized; after determining that the magnitude of the coil current has stabilized, stopping supply of voltage to the coil; after stopping the supply of voltage to the coil, determining a second amount of time for the magnitude of the coil current to drop below a second current threshold; determining whether the second amount of time does not exceed a second predetermined time threshold; responsive to determining that the second amount of time does not exceed the second predetermined time threshold, making a second determination that the plunger is not stuck; and responsive to determining that the second amount of time does exceed the second predetermined time threshold, determining that the plunger is stuck.

18. The apparatus of any of statements 14-17 further configured to carry out the operations of: responsive to making the first determination and the second determination that the plunger is not stuck, lowering the coil current to a hold current threshold; maintaining the contactor at an efficient power level; monitoring a magnitude of the coil current of the coil; determining whether the magnitude of the coil current changed within a first predetermined time period by at least a first predetermined amount; and responsive to determining that the magnitude of the coil current changed within the first predetermined time period by at least the first predetermined amount, determining that the plunger has moved despite the contactor command signal not changing states.

19. The apparatus of any of statements 14-18 further configured to carry out the operations of: switching the contactor command signal to the open state; setting the coil drive voltage to zero; after switching the contactor command signal to the open state and setting the coil drive voltage to zero, measuring a third amount of time; determining whether the third amount of time exceeds a third predetermined time threshold and the coil current is reduced to zero; and after determining that the third amount of time exceeds the third predetermined time threshold and the coil current is reduced to zero, determining a current state of the contactor.

20. The apparatus of any of statements 14-19 wherein determining a current state of the contactor includes: connecting the contactor to the voltage supply that supplies the third predetermined voltage amount to the contactor; measuring a fourth amount of time for the magnitude of the coil current of the coil to exceed a third predetermined current threshold; determining whether the fourth amount of time exceeds a fourth predetermined time threshold; responsive to determining that the fourth amount of time does not exceed the fourth predetermined time threshold, determining that the contactor is in the open state; and responsive to determining that the fourth amount of time exceeds the fourth predetermined time threshold, determining that the contactor is in the closed state.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method for failure mode detection in a contactor, the contactor including a plunger and a coil, the coil configured to be energized with a current or a voltage, the contactor configured to move the plunger in response to a change in state of a contactor command signal, the contactor command signal having a first state and a second state, the first state of the contactor command signal directing the plunger to move to an open position that places the contactor in an open state in which the contactor does not connect a first connector and a second connector, the second state of the contactor command signal directing the plunger to move to a closed position that places the contactor in a closed state in which the contactor does connect the first connector and the second connector, the method comprising:
    determining that the contactor is in the closed state after changing the state of the contactor command signal to the second state;
    after determining that the contactor is in the closed state after changing the state of the contactor command signal to the second state, lowering a coil current of the coil to a hold current threshold;
    after lowering the coil current to the hold current threshold:
        maintaining the contactor at an efficient power level;
        monitoring a magnitude of the coil current of the coil;
        determining whether the magnitude of the coil current changed within a first predetermined time period by at least a first predetermined amount; and
        responsive to determining that the magnitude of the coil current changed within the first predetermined time period by at least the first predetermined amount, determining that the plunger has moved despite the contactor command signal not changing states.

2. The method of claim 1 further comprising:
    maintaining the contactor command signal in the open state;
    connecting the contactor to a voltage supply that supplies a first predetermined voltage amount to the contactor;
    measuring a first amount of time for a magnitude of the coil current of the coil to exceed a first predetermined current threshold;
    determining whether the first amount of time exceeds a first predetermined time threshold;
    responsive to determining that the first amount of time does not exceed the first predetermined time threshold, determining that the contactor is in the open state;
    responsive to determining that the first amount of time exceeds the first predetermined time threshold, determining that the contactor is in the closed state;
    switching the contactor command signal into the closed state that directs the plunger to move into the closed position that places the contactor in the closed state;
    connecting the contactor to the voltage supply that supplies a second voltage amount to the contactor;
    after applying the second voltage amount to the contactor, determining changes in the magnitude of the coil current of the coil over a period of time;
    determining whether determined changes of the coil current over the period of time are associated with a pattern that indicates the plunger moved from the open position to the closed position;
    responsive to determining that the determined changes are associated with the pattern, making a first determination that the plunger is not stuck; and
    responsive to determining that the determined changes are not associated with the pattern, determining that the plunger is stuck.

3. The method of claim 2 further comprising:
    determining that the magnitude of the coil current has stabilized;
    after determining that the magnitude of the coil current has stabilized, stopping supply of voltage to the coil;
    after stopping the supply of voltage to the coil, determining a second amount of time for the magnitude of the coil current to drop below a second current threshold;
    determining whether the second amount of time does not exceed a second predetermined time threshold;
    responsive to determining that the second amount of time does not exceed the second predetermined time threshold, making a second determination that the plunger is not stuck; and
    responsive to determining that the second amount of time does exceed the second predetermined time threshold, determining that the plunger is stuck.

4. The method of claim 1 further comprising:
    switching the contactor command signal to the open state;
    setting coil drive voltage to zero;
    after switching the contactor command signal to the open state and setting the coil drive voltage to zero, measuring a third amount of time; and
    determining whether the third amount of time exceeds a third predetermined time threshold and the coil current is reduced to zero.

5. The method of claim 4 further comprising:
    after determining that the third amount of time exceeds the third predetermined time threshold and the coil current is reduced to zero, connecting the contactor to a voltage supply that supplies the third predetermined voltage amount to the contactor;
    measuring a fourth amount of time for the magnitude of the coil current of the coil to exceed a third predetermined current threshold;
    determining whether the fourth amount of time exceeds a fourth predetermined time threshold;
    responsive to determining that the fourth amount of time does not exceed the fourth predetermined time threshold, determining that the contactor is in the open state; and
    responsive to determining that the fourth amount of time exceeds the fourth predetermined time threshold, determining that the contactor is in the closed state.

6. An apparatus for failure mode detection in a contactor, the contactor including a plunger and a coil, the coil configured to be energized with a current or a voltage, the contactor configured to move the plunger in response to a change in state of a contactor command signal, the contactor command signal having a first state and a second state, the first state of the contactor command signal directing the plunger to move to an open position that places the contactor in an open state in which the contactor does not connect a first connector and a second connector, the second state of the contactor command signal directing the plunger to move to a closed position that places the contactor in a closed state in which the contactor does connect the first connector and the second connector, the apparatus configured to carry out the operations of:

determining that the contactor is in the closed state after changing the state of the contactor command signal to the second state;

after determining that the contactor is in the closed state after changing the state of the contactor command signal to the second state, lowering a coil current of the coil to a hold current threshold;

after lowering the coil current to the hold current threshold:

maintaining the contactor at an efficient power level;

monitoring a magnitude of the coil current of the coil;

determining whether the magnitude of the coil current changed within a first predetermined time period by at least a first predetermined amount; and responsive to determining that the magnitude of the coil current changed within the first predetermined time period by at least the first predetermined amount, determining that the plunger has moved despite the contactor command signal not changing states.

7. The apparatus of claim 6 further configured to carry out the operations of:

determining that a previously determined state of the contactor is the open state and the contactor command signal is in the open state;

connecting the contactor to a voltage supply that supplies a first predetermined voltage amount to the contactor;

measuring a first amount of time for a magnitude of a coil current of the coil to exceed a first predetermined current threshold;

determining whether the first amount of time exceeds a first predetermined time threshold;

responsive to determining that the first amount of time does not exceed the first predetermined time threshold, determining that the contactor is in the open state;

responsive to determining that the first amount of time exceeds the first predetermined time threshold, determining that the contactor is in the closed state;

switching the contactor command signal into the closed state that directs the plunger to move into the closed position that places the contactor in the closed state;

connecting the contactor to the voltage supply that supplies a second voltage amount to the contactor;

after applying the second voltage amount to the contactor, determining changes in the magnitude of the coil current of the coil over a period of time;

determining whether determined changes of the coil current over the period of time are associated with a pattern that indicates the plunger moved from the open position to the closed position;

responsive to determining that the determined changes are associated with the pattern, making a first determination that the plunger is not stuck; and responsive to determining that the determined changes are not associated with the pattern, determining that the plunger is stuck.

8. The apparatus of claim 7 further configured to carry out the operations of:

determining that the magnitude of the coil current has stabilized;

after determining that the magnitude of the coil current has stabilized, stopping supply of voltage to the coil;

after stopping the supply of voltage to the coil, determining a second amount of time for the magnitude of the coil current to drop below a second current threshold;

determining whether the second amount of time does not exceed a second predetermined time threshold;

responsive to determining that the second amount of time does not exceed the second predetermined time threshold, making a second determination that the plunger is not stuck; and responsive to determining that the second amount of time does exceed the second predetermined time threshold, determining that the plunger is stuck.

9. The apparatus of claim 8 further configured to carry out the operations of determining that the magnitude of the coil current has stabilized;

after determining that the magnitude of the coil current has stabilized, stopping supply of voltage to the coil;

after stopping the supply of voltage to the coil, determining a second amount of time for the magnitude of the coil current to drop below a second current threshold;

determining whether the second amount of time does not exceed a second predetermined time threshold;

responsive to determining that the second amount of time does not exceed the second predetermined time threshold, making a second determination that the plunger is not stuck; and responsive to determining that the second amount of time does exceed the second predetermined time threshold, determining that the plunger is stuck.

10. The apparatus of claim 6 further configured to carry out the operations of:

switching the contactor command signal to the open state;

setting coil drive voltage to zero;

after switching the contactor command signal to the open state and setting the coil drive voltage to zero, measuring a third amount of time;

determining whether the third amount of time exceeds a third predetermined time threshold and the coil current is reduced to zero; and after determining that the third amount of time exceeds the third predetermined time threshold and the coil current is reduced to zero, determining a current state of the contactor.

11. The apparatus of claim 10 wherein determining a current state of the contactor includes:

connecting the contactor to voltage supply that supplies the third predetermined voltage amount to the contactor;

measuring a fourth amount of time for the magnitude of the coil current of the coil to exceed a third predetermined current threshold;

determining whether the fourth amount of time exceeds a fourth predetermined time threshold;

responsive to determining that the fourth amount of time does not exceed the fourth predetermined time threshold, determining that the contactor is in the open state; and responsive to determining that the fourth amount of time exceeds the fourth predetermined time threshold, determining that the contactor is in the closed state.

\* \* \* \* \*